United States Patent [19]

Koch et al.

[11] Patent Number: 5,367,665

[45] Date of Patent: Nov. 22, 1994

[54] MULTI-PROCESSOR SYSTEM IN A MOTOR VEHICLE

[75] Inventors: Stefan Koch, Ottersweier; Harald Bühren, Bühl, both of Germany

[73] Assignee: Robert Bosch GmbH, Stuttgart, Germany

[21] Appl. No.: 869,801

[22] Filed: Apr. 16, 1992

[30] Foreign Application Priority Data

Apr. 16, 1991 [DE] Germany ................ 4112334

[51] Int. Cl.$^5$ .............................. G06F 11/00
[52] U.S. Cl. ........................ 395/575; 371/9.1; 371/12; 364/280.3
[58] Field of Search ............. 371/9.1, 8.1, 68.3, 371/12; 395/575; 364/280.3, 280.2, 285.2, 449, 454

[56] References Cited

U.S. PATENT DOCUMENTS

| | | | |
|---|---|---|---|
| 4,410,991 | 10/1983 | Lenart | 371/66 |
| 4,610,013 | 9/1986 | Long et al. | 371/9.1 |
| 4,710,926 | 12/1987 | Brown et al. | 371/9.1 |
| 4,745,602 | 5/1988 | Morrell | 371/29.1 |
| 4,797,828 | 1/1989 | Suzuki et al. | 364/431.04 |
| 4,860,196 | 8/1989 | Wengert | 364/200 |
| 4,881,227 | 11/1989 | Bühren | 371/9.1 |
| 4,899,282 | 2/1990 | Holmes | 364/431.08 |
| 5,053,943 | 10/1991 | Yokoyama | 364/200 |
| 5,303,390 | 4/1994 | Little | 395/575 |

FOREIGN PATENT DOCUMENTS 9218525 12/1984 Japan .............. G06F 1/00
WO89/09957 10/1989 WIPO .

OTHER PUBLICATIONS

"Elektronische Motorsteuerung für Kraftfahrzeuge" by G. Kolberg, MTZ (Motortechnische Zeitschrift), year 46, vol. 4, 1985.

Primary Examiner—Robert W. Beausoliel, Jr.
Assistant Examiner—Albert Decady
Attorney, Agent, or Firm—Walter Ottesen

[57] ABSTRACT

The invention is directed to a multi-processor system which includes at least two processors. The system carries out a first sequence of steps when power is switched on and, for a restart during operation, executes a second sequence of steps. The system distinguishes between power on and a restart and selects, the corresponding step sequence. In addition, a check is provided as to whether the number of resets of a processor has exceeded a pregiven threshold. In this case, a processor is transferred into the standby state for the operating cycle which is then running.

10 Claims, 2 Drawing Sheets

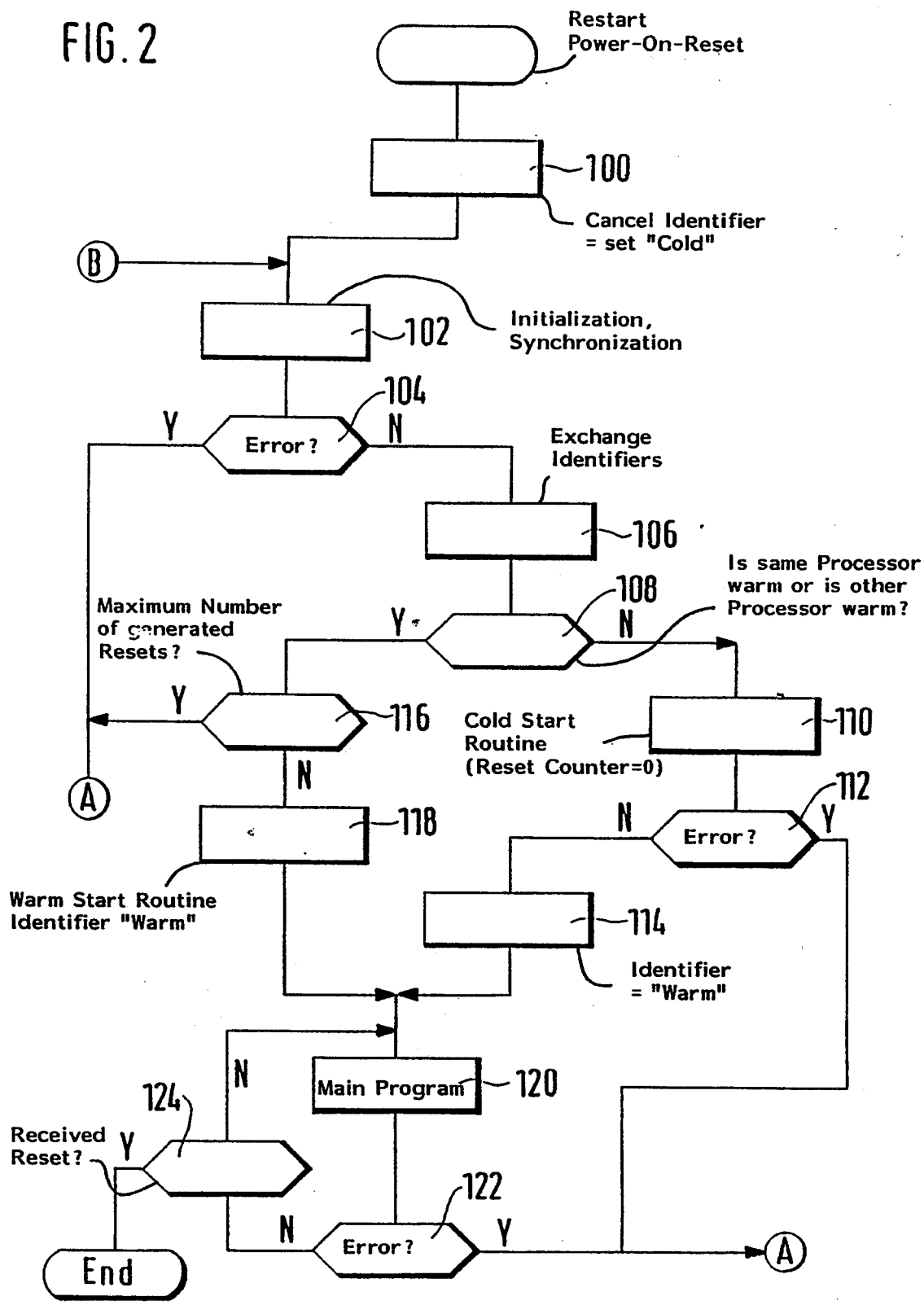

MULTI-PROCESSOR SYSTEM IN A MOTOR VEHICLE

FIELD OF THE INVENTION

The invention relates to a multi-processor system in a motor vehicle which includes at least two processors for carrying out control functions.

BACKGROUND OF THE INVENTION

Such a system is disclosed in U.S. Pat. No. 4,881,227. Here, a two-processor system for a motor vehicle is described wherein the two processors carry out control functions in the motor vehicle while mutually exchanging data. An operational cycle of the motor vehicle is initiated generally by closing the ignition switch. At the beginning of an operating cycle, the two processors carry out a so-called cold start which is triggered by a so-called "power-on-reset" pulse. In addition, measures are suggested which detect an error condition in the computer system with the aid of the cyclical data exchange between the two processors and by means of further mutual monitoring devices such as watch dogs. Furthermore, the possibility is provided for each processor to start or reset the other processor after that processor has detected an error condition in the computer system.

As a rule, and especially for applications with respect to safety-relevant control systems in motor vehicles, the measures for cold starting the computer system include extensive tests and checks of different components which are absolutely necessary for carrying out the control functions. Measures of this kind occupy the computer system because of their extent for a certain time during which the computer system is inactive with reference to the control functions. It is therefore not desirable that these measures following a cold start be carried out for each reset of a processor because of an error condition or because of cyclical restarts undertaken possibly during operation. The known computer system offers no possibility of distinguishing between warm and cold starts of the system so that with each reset the same extensive sequence of steps is run through. However, this limits the availability of the computer system. The desire to distinguish the operable processor from the inoperable processor in a two-processor system is attempted to be satisfied in the above-mentioned system by means of extensive checks and monitoring which likewise tie up the processors for some time.

SUMMARY OF THE INVENTION

It is an object of the invention to provide a multi-processor system in a motor vehicle wherein availability of the multi-processor system is improved and wherein a simplification of the procedures which are run through is obtained.

The above object is realized in that means are provided which distinguish between cold and warm starts and initiate corresponding step sequences. Furthermore, these means can be configured such that when a pregiven number of resets of a processor is exceeded, a processor can be shifted into a standby condition during the operating cycle of the system.

In addition to applications in ABS and ASR systems, engine control systems, etcetera, multi-processor systems are applied in motor vehicles especially in gas supplying systems or so-called motor power controls (electronic engine-control systems). One such system is described in the article of G. Kolberg entitled "Elektronische Motorsteuerung für Kraftfahrzeuge" published in the Motortechnische Zeitschrift, Volume 4 (1985) pages 2 to 6. In systems of this kind, monitoring of the processors is of special significance since an unwanted supplying of gas by these systems can have as a consequence critical driving conditions. In addition, a so-called "predrive check" is provided in systems of this kind during which various essential components are checked as to their operability when starting at the beginning of an operating cycle. These components include the output stage of the system or various measuring devices or the fuel pump relay. Storage operations and/or the learning of the end stops of the power-determining element are carried out. As mentioned above, these checks consume a certain amount of time and therefore, in such systems, it is necessary to effectively distinguish between cold and warm starts as well as having a rapid detection of an error in the system.

One possibility of distinguishing between warm and cold starts is disclosed in International patent publication WO-A 89/09957 wherein the reset pulse for a processor when turning power on is supplied to another physical input of the processor such as the cyclical resets or the reset by means of a detected error condition. In this way, the processor becomes capable of distinguishing between cold and warm starts.

The measures provided by the invention improve the availability of a multi-processor system in a motor vehicle and contribute to the simplification thereof.

The time needed to start the processors is shortened by the capability of distinguishing between cold and warm starts of the processors. The necessary checks of essential components at the start of an operating cycle when starting the system can still be carried out.

By counting the reset pulses transmitted from one processor to the other and by shifting the processor into a standby condition, which has detected that a certain number of resets has been exceeded switches off the system in this case. The control functions of the computer system can then be switched off or can be carried out to the simplest extent.

BRIEF DESCRIPTION OF THE DRAWINGS

The invention will now be described in reference to the drawings wherein.

DESCRIPTION OF THE PREFERRED EMBODIMENTS OF THE INVENTION

Figure 1:
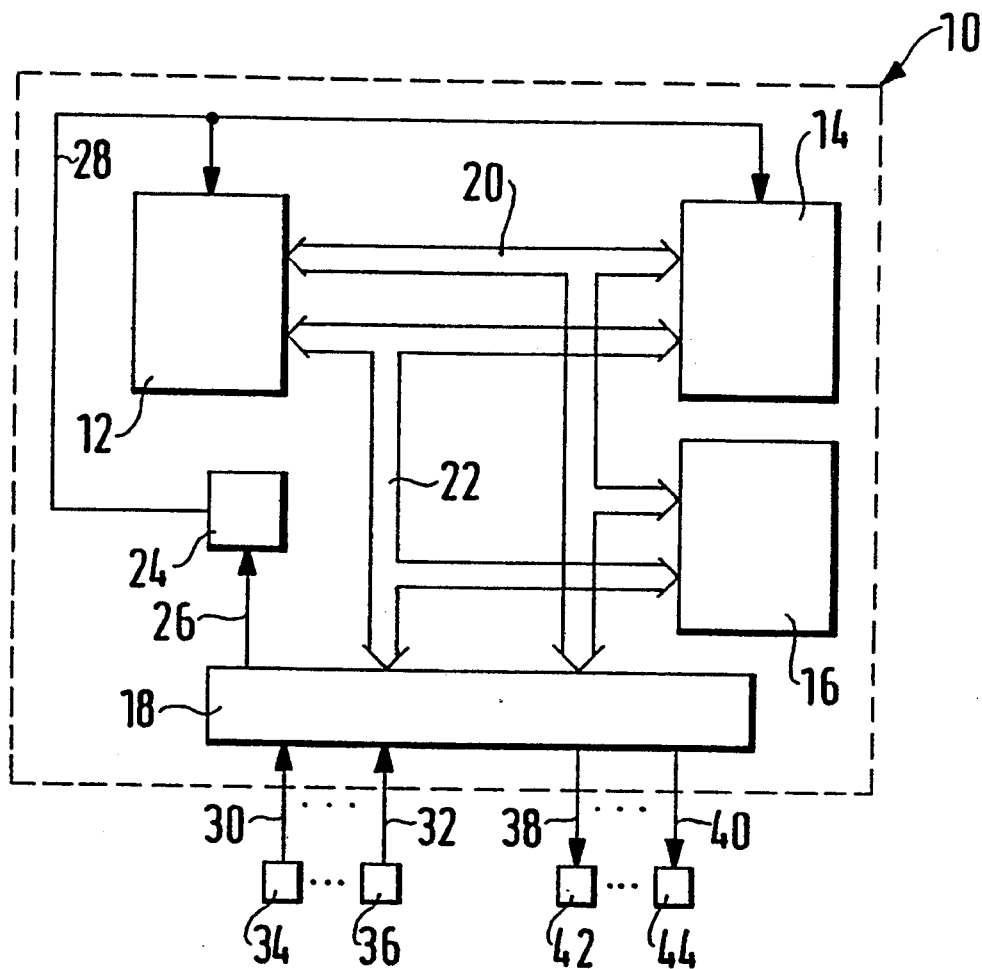
FIG. 1 shows a two-processor system as exemplary of a multi-processor system with application to the control system in a motor vehicle and especially an electronic engine power control; and, FIGS. 2 and 3 show an overview flowchart of the step sequences which are run through in the processors.

FIG. 1 shows a control system 10 which includes two processors 12 and 14. The processors 12 and 14 define conventional processors. Both processors are connected to each other as well as to a memory unit 16 and an input/output unit 18 via bus systems 20 and 22. The bus systems 20 and 22 are provided on the one hand for example for address and data information exchange while, on the other hand, for control signal and check signal exchange.

In addition, a logic circuit 24 is provided to which an input line 26 is led which connects the logic unit 24 to the input/output unit 18. The logic circuit 24 also has an output line 28 which leads to the processors 12 and 14. The input/output unit 18 is connected via input lines 30 to 32 to measuring devices 34 to 36, respectively, which detect operating variables of the engine and/or of the motor vehicle. The output lines 38 to 40 of the input/output unit 18 connect the control system 10 to actuating devices or components 42 to 44 by means of which the functions of the control system 10 are carried out.

The above-described basic structure of a two-processor system can be applied in many ways in motor vehicles, for example, in electronic engine-control systems, ABS/ASR systems or for engine controls. In accordance with the application, specific operating variables for the particular application are therefore applied to the control system 10 from the corresponding measuring devices 34 to 36; whereas, corresponding components 42 to 44 are provided for carrying out particular control functions.

Thus, for electronic engine-control systems, operating variables such as accelerator pedal position, brake actuation, engine speed, road speed, battery voltage, position of the power-determining element, ASR/MSR intervention signals, engine temperature, etcetera are supplied to the control system 10 by the measuring devices 34 to 36. Drive signals are supplied via the output lines 38 to 40 to the output stages of particular components such as a motor-driven throttle flap or an injection pump or drive signals are supplied to safety devices such as a switching relay of the fuel pump of the motor vehicle for carrying out the power control.

Other corresponding devices are provided in ABS/ASR systems such as brake pressure regulators, injection valves, ignition adjusting devices, etcetera. The operating variables detected by the measuring devices 34 to 36 then change correspondingly. The computer system described herein is also applicable to motor vehicles having electric drives or other drive concepts.

Common to all systems is that the start of an operating cycle by the closure of a switch by rotating a key is detected by one of the measuring devices 34 to 36 and is supplied to the control system 10 for the purpose of switching power on.

In the exemplary overview schematic of FIG. 1, the data and address exchange between the processors, the memory region 16 and the input/output unit 18 takes place via bus system 20; whereas, check and control signals, for example, the mutual watch-dog monitoring, status signals, interrupts, the resets and identifiers to be described below, etcetera are transmitted via the bus system 22. Furthermore, still further hardware components not shown in FIG. 1 can be provided, for example, watch-dog circuits for each individual processor.

In the following, an embodiment will be described in the context of an exemplary electronic engine power control. When the system is started, an appropriate signal is conducted from the ignition switch via the input/output unit 18 and the line 26 to the logic unit 24. The logic unit 24 converts the detected signal into a so-called power-on reset pulse which is supplied via the output line 28 to the processors 12 and 14. These processors carry out synchronization and initialization steps in the context of a first step sequence and carry out measures provided for a cold start. In addition to self-tests and tests of the write/read memories, the following are considered important: a check of the output stage of the actuator for the power of the engine, the capability of switching the engine off, a check of the safety relay of the fuel pump of the motor vehicle which can be switched off, checks of measuring devices and safety systems and/or the learning of stops of the actuator. These and further measures are considered together under the term "predrive check". Furthermore, in this phase, the data exchange between the two processors via the bus system 20 is checked.

Figure 3:
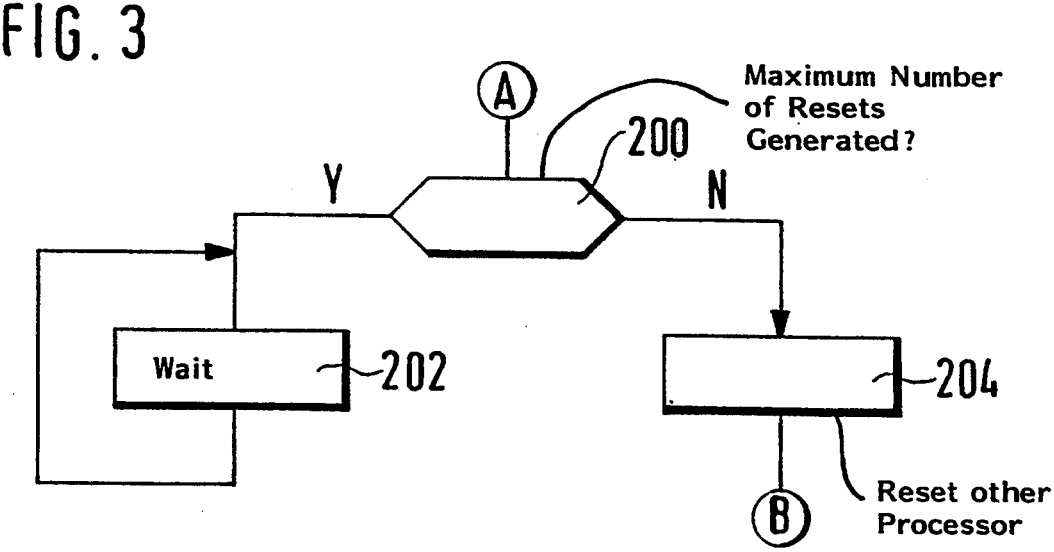

If one of the processors detects an error condition in the computer system, for example in the context of a violation of the described protocol of the data exchange or a defective or run-through watch dog, then the one processor sends a reset pulse to the other processor and resets the other processor. An internal counter, which detects the number of transmitted resets, is incremented. In this error condition, both processors then carry out a restart, the so-called warm start. This includes an abbreviated second step sequence wherein the predrive check is completely omitted or at least partially omitted. Cold starts and warm starts are distinguished from each other with corresponding identifiers of the two processors as shown in FIGS. 2 and 3. The resetting processor advises the reset processor that a warm start is to be carried out. If one of the two processors reaches a maximum pregiven number of carried out resets, then this processor is shifted into standby for this operating cycle. Experience has shown that in this case, the other processor also reaches the pregiven number of resets and then transfers into standby. In this way, the system is transferred into a safe condition.

In normal operation, the two processors control the power of the engine via the actuators 42 to 44 in dependence upon the driver request detected via the measuring devices 34 to 36 and in dependence upon other operating variables of the engine and/or of the motor vehicle. This control of the engine controls the motor vehicle in the sense of an adaptation of the power to the driver's request while considering the additional operating variables of the motor vehicle.

The mutual monitoring measures of the two processors are described in the above-mentioned U.S. Pat. No. 4,881,227 which is incorporated herein by reference especially with respect to these monitoring measures.

FIGS. 2 and 3 show an overview flowchart of the program executed in each of the processors after a reset (cold start or warm start).

Starting with the power on of the computer system, the described program part is initiated with step 100. There, an identifier (one or several bits read into a memory element) of the processor is cancelled which shows if a cold start condition or a warm start condition is present for the particular processor. In step 100, this identifier is transferred into the state "cold". Thereafter, the program proceeds to step 102 which includes initialization and synchronization steps of the two processors. In this way, the internal registers, pointer functions and communication lines are initialized, the two processors are synchronized by an exchange of corresponding check signals and the data transmission lines are tested. The inquiry 104 which follows symbolizes the error check run through in the initialization and synchronization step. If an error is detected in accordance with step 104, for example, in the data transmission or in the watch dog, then the program continues with FIG. 3; whereas, in the event of an error-free initialization and synchronization, the program is continued with program step 106.

Step 106 represents the measure to mutually exchange the cold start/warm start identifiers of the two processors. After the processor has received the identifier of the other processor, a check is made in inquiry step 108 as to whether its own identifier or the identifier of the other shows the state "warm start". If this is the case, a warm start of the particular processors is carried out; otherwise, a cold start routine is initiated.

The cold start routine carried out in step 110 includes the following individual measures. On the one hand, the write/read memory or memories of the processor or of the control system is checked as to their functions and the data contents are cancelled. In addition, the above-described predrive check is carried out. With the aid of this predrive check, the function of the output stage of the control system for driving the actuator is checked by means of a defined driving and monitoring of the current flowing through the output stage or the movement of the power-determining element and, if required, the end stops of the element are detected. The predrive check furthermore includes a check of the safety paths for switch-off of the system in the event of an error. The function of the fuel pump relay is especially checked. A check of the switch-off capability of the output stage by the control system also constitutes part of this first step sequence. Furthermore, the check of the data lines takes place several times. The reset counter of the processor is set to zero.

In the inquiry step 112 which is executed thereafter, the error monitoring which takes place during the cold start routine is included. In this error monitoring, a check is made as to whether an error condition has occurred during the cold start routine. This error condition can be recognized by a violation of the data exchange requirements, by means of the watch dog or by means of the checks made in the context of the predrive check. If an error of this kind is detected in the inquiry step 112, the program continues in the context of the description according to FIG. 3. In the opposite case, the identifier of the processor in step 114 is set to a value representing a "warm start" as if a cold start routine has been executed in the particular operating cycle. In this way, the cold start routine is concluded.

If in inquiry step 108, the processor detects its own identifier as warm or the identifier of the other processor as warm, then the program continues with inquiry step 116 wherein the check is made as to whether the particular processor has generated a maximum number of resets.

If this maximum pregiven number is reached or exceeded, then the program part in FIG. 3 is carried out. Otherwise, a second step sequence (a warm start routine) is initiated after the conclusion of which the identifier "warm" is set. The warm start routine is substantially shorter than the previously described cold start routine carried out in step 110. A warm start routine includes essentially a cancelling of the write/read memory, the initialization of the time functions, fixing of priorities, etcetera. In contrast to the cold start routine, the predrive check is omitted as is the test of the write/read memory etcetera. For these reasons, the warm start routine according to step 118 is shorter than the cold start routine executed in step 110.

Error monitoring can be undertaken during the warm start routine as with the execution of the previously described cold start routine. When an error is detected, the error monitoring can initiate a continuation of the program in accordance with FIG. 3.

The application programs are carried out in accordance with step 120 after conclusion of the start routines. The computer system is, for example, checked with respect to error conditions based on the data exchange or the watch dog while the application programs are carried out. This is symbolized by the inquiry step 122. If one of tile processors detects an error condition in the computer system after step 122, then the processor initiates the measures shown in FIG. 3. The inquiry step 124 is integrated into the execution of the application program according to step 120 in the manner of inquiry step 122. In the other case, a check is made as to whether a reset is present from the other processor which triggers this reset for example because of an error condition in the system. If this is not the case, the loop of steps 120 to 124 is retained; whereas, for this processor, the program of FIG. 2 is started anew with step 100 when a reset is present. The realization of this program step can also take place in that the reset pulse automatically triggers a new start by means of circuitry measures.

Error checks were made at several locations in the description of the program of FIG. 2. If an error was detected, then the processor detecting the error jumps into the program part shown in FIG. 3. This begins with an inquiry in step 200 as to whether the particular processor has already generated the maximum number of resets. If this is the case, the processor is shifted to standby according to step 202 which it retains during the operating cycle. This standby condition includes for example measures which inhibit the drive of the actuator by means of this processor. In addition, an error indication is made.

If it is recognized in step 200 that the particular processor has not yet generated the maximum number of resets in an operating cycle, then the other processor is reset by issuing a reset signal according to step 204 and the reset counter is incremented by 1. Thereafter, the processor jumps into the program part of FIG. 2 between the steps 100 and 102.

In addition to the check of a pregiven number of resets during the entire operating cycle of the system, as an alternate, a measure can be provided which permits a pregiven number of resets within a pregiven time duration and which initiates the standby condition of the particular processor when this maximum number of resets is exceeded within the pregiven time duration.

In summary, it can be concluded that with the measures shown and described with respect to FIGS. 2 and 3, it is possible, on the one hand, to distinguish between cold and warm starts and, on the other hand, a rapid simple detection of an error in the system is possible. If one processor receives a reset from the other processor, then the processor is started anew and its identifier set to cold start. In contrast thereto, the resetting processor, which as the first of the two processors had detected the error condition in the system, is initialized and restarted but its identifier representing the warm start state is retained. This fact permits differentiating between warm start and cold start. The processor which has generated a maximum number of resets is transferred into standby.

In another advantageous embodiment, the number of resets received by a processor is counted.

It is understood that the foregoing description is that of the preferred embodiments of the invention and that various changes and modifications may be made thereto without departing from the spirit and scope of the invention as defined in the appended claims.

What is claimed is:

1. A multi-processor system for a motor vehicle for carrying out control functions, the system comprising:
   at least two processors;
   said processors each including means for detecting a fault of the other one of said processors during the operation of said system and means for generating a reset signal to trigger a restart of said system during the operation thereof;
   means for supplying said reset signal to each of said processors at the beginning of an operating cycle when power is switched on to start said system;
   said reset signal being supplied to said processors to carry out a first step sequence to define a cold start routine when power is switched on and to carry out a second step sequence to define a warm start routine when restarting said system;
   each of said processors including means for distinguishing between when power is switched on and a restart based on changeable identifiers;
   each of said processors having a changeable identifier which is set to a first pregiven value by said reset signal and which is set to a second pregiven value by said reset signal after said system is started;
   means for permitting said processors to exchange their identifiers; and,
   each of said processors including means for comparing its own identifier to the identifier of the other processor to distinguish between when said power is switched on and a restart and for selecting the corresponding one of said step sequences.

2. The multi-processor system of claim 1, wherein said one processor is shifted into a standby state until power is switched on again.

3. The multi-processor system of claim 1, wherein each of said processors has an identifier which assumes a first value when power is switched on and which, after said first step sequence is ended, takes on a second value and which, with each restart by another processor, again assumes said first value.

4. The multi-processor system of claim 1, wherein said first step sequence is carried out when the identifier words of all processors of said system have the same value and wherein otherwise said second step sequence is carried out.

5. The multi-processor system of claim 1, wherein the value of the identifier of the processor, which is resetting the other processor, is maintained.

6. The multi-processor system of claim 1, wherein said system is used in engine controls for motor vehicles.

7. The multi-processor system of claim 1, wherein said first step sequence includes a complete check of the function of the engine control system for said motor vehicle.

8. The multi-processor system of claim 7, wherein said second step sequence is shorter than said first step sequence.

9. The multi-processor system of claim 1, further comprising means for activating an error indication when one of said processors is shifted into a standby state.

10. The multi-processor system of claim 1, wherein said processor which had been shifted into a standby state in a previous operating cycle is started in a normal manner when the power is switched on again.

* * * * *